United States Patent [19]

Peifer et al.

[11] Patent Number: 5,705,578
[45] Date of Patent: Jan. 6, 1998

[54] METHOD FOR MAKING AND USING A SUPPORTED METALLOCENE CATALYST SYSTEM

[75] Inventors: Bernd Peifer; Helmut G. Alt; M. Bruce Welch, all of Bartlesville, Okla.

[73] Assignee: Phillips Petroleum Company, Bartlesville, Okla.

[21] Appl. No.: 434,232

[22] Filed: May 4, 1995

[51] Int. Cl.$^6$ .................................. C08F 4/642
[52] U.S. Cl. ................ 526/160; 526/127; 526/64; 526/943; 502/108; 502/109
[58] Field of Search .................... 526/943, 127, 526/160, 64; 502/104, 108, 109, 120

[56] References Cited

U.S. PATENT DOCUMENTS

| | | | |
|---|---|---|---|
| 4,871,705 | 10/1989 | Hoel | 502/117 |
| 5,106,804 | 4/1992 | Bailly et al. | 502/108 |
| 5,122,583 | 6/1992 | Ewen et al. | 526/124.9 |
| 5,240,894 | 8/1993 | Burkhardt et al. | 502/108 |
| 5,391,790 | 2/1995 | Rohrmann et al. | 556/28 |
| 5,393,851 | 2/1995 | Ewen et al. | 526/153 |
| 5,498,581 | 3/1996 | Welch et al. | 502/102 |

FOREIGN PATENT DOCUMENTS

| | | |
|---|---|---|
| 577581 | 6/1993 | European Pat. Off. |
| 586167 | 8/1993 | European Pat. Off. |

OTHER PUBLICATIONS

Tetrahydron Letters, 50, pp. 4467–4470 (1975).
J. Org. Chem, 48, pp. 1854–1862 (1983).

*Primary Examiner*—Mark Nagumo
*Attorney, Agent, or Firm*—Edward L. Bowman

[57] ABSTRACT

Methods are disclosed for preparing a highly active solid metallocene-containing catalyst system and its use in the polymerization of olefins. The solid catalyst system is prepared by combining an aluminoxane with a metallocene having a substituent which has internal alkynyl unsaturation in a suitable liquid to form a liquid catalyst system, conducting prepolymerization of an olefin in the liquid catalyst system, and separating the resulting solid metallocene-containing catalyst system from the last reaction product mixture. Also polymerization of olefins using the inventive solid catalyst system is disclosed.

30 Claims, No Drawings

METHOD FOR MAKING AND USING A SUPPORTED METALLOCENE CATALYST SYSTEM

FIELD OF THE INVENTION

This invention relates to a new type of solid particulate metallocene catalyst system useful for the polymerization and/or copolymerization of olefins. The invention is also related to a process for conducting polymerization of olefins using the inventive solid metallocene catalyst system.

BACKGROUND OF THE INVENTION

The term "Metallocene" as used herein refers to a derivative of cyclopentadienylidene which is a metal derivative containing at least one cyclopentadienyl component which is bonded to a transition metal. The transition metal is selected from Groups IVB, VB, and VIB, preferably IVB and VIB. Examples include titanium, zirconium, hafnium, chromium, and vanadium. A number of metallocenes have been found to be useful for the polymerization of olefins. Generally, the more preferred catalysts are metallocenes of Zr, Hf, or Ti.

Generally, in order to obtain the highest activity from metallocene catalysts, it has been necessary to use them with an orgartoaluminoxane cocatalyst, such as methylaluminoxane. This resulting catalyst system is generally referred to as a homogenous catalyst system since at least part of the metallocene or the organoaluminoxane is in solution in the polymerization media. These homogenous catalysts systems have the disadvantage that when they are used under slurry polymerization conditions, they produce polymer which sticks to reactor walls during the polymerization process and/or polymer having small particle size and low bulk density which limits the commercial utility.

Some attempts to overcome the disadvantages of the homogenous metallocene catalyst systems are disclosed in U.S. Pat. Nos. 5,240,894, 4,871,705; and 5,106,804. Typically, these procedures have involved the prepolymerization of the metallocene aluminoxane catalyst system either in the presence of or in the absence of a support. An evaluation of these techniques has revealed that there is still room for improvement, particularly when the catalyst is one which is to be used in a slurry type polymerization where the object is to produce a slurry of insoluble particles of the end product polymer rather than a solution of polymer which could result in fouling of the reactor. In the operation of a slurry polymerization in a continuous loop reactor it is extremely important for efficient operations to limit polymer fouling of the internal surfaces of the reactor. The term "fouling" as used herein refers to polymer buildup on the surfaces inside the reactor.

Recently published ECP Application 586,167 discloses forming a prepolymer by copolymerizing ethylene and metallocenes containing a polymerizable olefinic substituents. While that publication might be viewed as suggesting that any polymerizable substituents would be suitable, it does not indicate whether or not alknynl substituents would in fact prepolymerize with a comonomer to yield a solid which would reduce the fouling observed when used in particle-form polymerization. Further EPC 586,167 is not considered to indicate whether or not it would even be possible to produce metallocenes having alkynyl substituents. Some of the coinventors of this application attempted to produce and isolate metallocenes having substituents with terminal alkynyl groups and were not successful. When the ligands having terminal alkynyl groups were reacted with a transition metal halide to produce the metallocene a polymeric product was obtained. Although the product may be viewed as a supported form of a metallocene it was not considered to contain alkynyl groups that would be available for prepolymerization with a comonomer.

An object of the present invention is to provide a new method for preparing a solid metallocene catalyst system from metallocenes containing internal alkynyl substituents. In accordance with another aspect of the present invention, there is provided a method for polymerizing olefins using the new type of prepolymerized metallocene. A particular object is to provide a solid catalyst system that can be used in particle-form polymerization with minimal fouling.

SUMMARY OF THE INVENTION

In accordance with the present invention, a solid particulate metallocene-containing catalyst system is produced by (a) combining an organoaluminoxane and at least one metallocene having a ligand having at least one substituent with internal alkynyl functionality in a liquid to form a liquid catalyst system, (b) conducting prepolymerization of at least one olefin in the presence of said liquid catalyst system, to produce a prepolymerized solid catalyst, and (c) separating the resulting solid from the liquid and the components dissolved in the liquid, said solid being the solid particulate metallocene catalyst system. The phrase "liquid catalyst system" as used herein refers to the combination of the aluminoxane, the metallocene, and the liquid, irrespective of whether the aluminoxane and/or the metallocene are totally dissolved in the liquid.

In accordance with another aspect of the present invention, the resulting inventive solid particulate metallocene-containing catalyst system is employed in the polymerization of an olefin by contacting the olefin with the inventive solid particulate metallocene-containing catalyst system under suitable reaction conditions.

DETAILED DESCRIPTION OF THE INVENTION

A wide range of metallocenes are considered to be applicable to the present process. The essential feature is that the metallocene be one wherein at least one ligand has a substituent having an internal alkyne functionality. The invention is considered applicable to both bridged and unbridged metallocenes. The unbridged metallocenes can even include bridged ligands which contain two cyclopentadienyl-type radicals connected by a suitable bridging structure wherein only one of the cyclopentadienyl-type radicals of that ligand is bonded to the transition metal.

The metallocenes of the type contemplated as useful for the present invention include bridged metallocenes represented by the formulas $R(Z)(Z)MeQ_k$ and unbridged metallocenes of the formula $(Z)(Z)MeQ_k$ wherein each Z is bound to Me and is the same or different and is a cyclopentadienyl-type ligand selected from substituted or unsubstituted cyclopentadienyl, indenyl, tetrahydroindenyl, octahydrofluorenyl, benzofluorenyl, and fluorenyl ligands; R is a structural bridge linking the Z's and Me is a metal selected from the group consisting of IVB, VB, and VIB metals of the Periodic Table, each Q is the same or different and is selected from the group consisting of hydrogen, halogens, and organoradicals; k is a number sufficient to fill out the remaining valances of Me; with the further proviso at least one of said Z's or R has at least one internal alkynyl substituent attached to it. Thus in bridged metallocenes this internal alkynyl substituent can be a branch on the bridging unit R and/or on one or both of the cyclopentadienyl-type groups of the bridged ligands.

The present invention thus envisions using bridged metallocenes wherein R is a divalent radical selected from the group consisting of alkylene radicals, diorgano divalent radicals of Si, Ge, and Sn, and divalent organo radicals of P and N. If R is a divalent radical of Si, Ge, Sn, P, or N the other valences are preferably attached to hydrocarbyl groups. Generally R has 1 to 30 carbon atoms exclusive of any alkynyl branch. If R is alkylene it preferably contains about 1 to carbon atoms exclusive of any alkynyl branch.

The term internal alkynyl substituent is used herein to refer to substituents of the formula

where R' is a organo group. The number of carbon atoms in the organo group can vary over a wide range, but generally would be in the range of about 1 to about 20, more typically about 1 to about 10. In the currently preferred embodiments R' is hydrocarbyl, preferably alkyl or aryl.

Various techniques are known in the art for producing various ligands having internal alkynyl substitution. For example EPC 577,581 discloses preparing 2,7-di(t-butylethynyl) fluorene by reacting 2,7-di(iodo)flourene with t-butyl acetylene in the presence of an organopalladium catalyst. Such techniques are described in J. Org. Chem. 48, 1854–1862 (1983). Similarly Izv. Akad. Nauk SSSR, Ser. Khim. 1975,(2), 441–442 discloses the preparation of 2,7-di (phenylethynyl)fluorene by the reaction of 2,7-di(iodo) fluorene with copper phenylacetylide. Branched bridged ligands useful for making metallocenes suitable for the present invention can also be prepared by reacting a dihalo compound having an alkynyl substituent branch with an alkali metal salt of a suitable cyclopentadiene-type compound to produce a compound of the formula Z—R—Z where R is a bridge having a branch having an alkynyl substituent and wherein each Z is the same or alternatively to first produce a compound of the formula Z—R—X wherein X is a halogen and then reacting that compound with an alkali metal salt of another different cyclopentadiene-type compound to produce a compound of the formula Z—R—Z wherein the two Z's differ. Such reactions can be carried out using conditions of the type disclosed in U.S. Pat. No. 5,191,132.

An alternate technique for forming a bridged ligand having internal alkynyl substituents involves reacting a carbonyl compound having olefinic unsaturation with cyclopentadiene in the presence of pyrrolidine and methanol to yield an alkenyl fulvene which is then reacted with an alkali metal salt of a cyclopentadiene compound having at least one internal alkynyl substituent, such as, for example, 2,7-di (phenylethynyl) fluorene to yield the unsaturated-branched-bridged ligand containing two cyclopentadienyl-type groups, i.e. fluorenyl and cyclopentadienyl. For example, one could react 5-hexene-2-one with cyclopentadiene using a procedure like that disclosed by Stone et al in *J. Org. Chem.*, 49, 1849 (1984) to yield 6-(3-butenyl)-6-methylfulvene which could then be reacted with 2,7-di (phenylethynyl) fluorenyl lithium and subsequent hydrolysis to yield 5-cyclopentadienyl-5-(2,7-di(phenylethynyl) fluorenyl)-1-hexene. Such a procedure results in a ligand having both olefinic and alkynyl substituents.

The metallocenes of alkynyl-containing ligands can be prepared by reacting the ligand with an alkali metal alkyl to produce a ligand salt that is then reacted with the transition metal compound to yield the metallocene, using the techniques generally known in the art for forming such metallocenes. See, for example, the technique disclosed in European Published Application 524,624, the disclosure of which is incorporated herein by reference.

Some typical examples of what is meant by metallocenes containing an alkynyl substituent as required by the present invention include 5-(cyclopentadienyl)-5-(2,7-di (2-phenylethynyl)fluorenyl)-1-hexene zirconium dichloride which could also be named 1-(cyclopentadienyl)-1-(2,7-di (2-phenylethynyl) fluorenyl)-1-(methyl)-1-butene methane zirconium dichloride, (2,7-di(phenylethynyl)fluorenyl) (cyclopentadienyl) zirconium dichloride, (2,7-di (phenylethynyl)fluorenyl) (cyclopentadienyl) hafnium dichloride, (2,7-di(t-butylethynyl)fluorenyl) (cyclopentadienyl) zirconium dichloride, (2,7-di(t-butylethynyl) fluorenyl) (cyclopentadienyl) hafnium dichloride, ((phenylethynyl)cyclopentadienyl) (cyclopentadienyl) zirconium dichloride, ((t-butylethynyl) cyclopentadienyl)(cyclopentadienyl) zirconium, (2,7-di(n-butylethynyl) fluorenyl) (cyclopentadienyl) zirconium dichloride, (2,7-di(n-butylethynyl)fluorenyl) (cyclopentadienyl) hafnium dichloride, (2,7-di (methylethynyl)fluorenyl) (cyclopentadienyl) zirconium dichloride, (2,7-di (methylethynyl)fluorenyl) (cyclopentadienyl) hafnium dichloride, 1,2-bis-(2,7-di (n-butylethynyl)fluorenyl) ethane zirconium dichloride, 1,2-bis-(2,7-di(n-butylethynyl)fluorenyl) ethane hafnium dichloride, 1,2-bis-(2,7-di (phenylethynyl)fluorenyl) ethane zirconium dichloride, 1,2-bis-(2,7-di(t-butylethynyl) fluorenyl) ethane zirconium dichloride, 1-(2,7-di(n-butylethynyl)fluorenyl)-1-(cyclopentadienyl)-1,1-di (methyl) methane zirconium dichloride, 1-(2-(n-butylethynyl)fluorenyl)-1-(cyclopentadienyl)-1,1-zirconium di(methyl) methane dichloride, 1-(indenyl)-1-(cyclopentadienyl)-1-(methyl)-1-(n-butylethynyl) methane zirconium dichloride, 1-(fluorenyl)-1-(cyclopentadienyl)-1-(methyl)-1-(methylethynyl) methane zirconium dichloride, 1-(fluorenyl)-1-(cyclopentadienyl)-1-(methyl)-1-(phenylethynyl) methane zirconium dichloride, 1-(fluorenyl)-1-(cyclopentadienyl)-1-(methyl)-1-(n-butylethynyl) methane zirconium dichloride, 1-(fluorenyl)-1-(cyclopentadienyl)-1-(methyl)-1-(t-butylethynyl) methane zirconium dichloride, 1-(2,7-di(n-butylethynyl) fluorenyl)-2-(indenyl) ethane zirconium dichloride, 1-(3-(n-butylethynyl)fluorenyl)-2-(indenyl) ethane zirconium, bis (9-fluorenyl)(methyl)(phenylethynyl)silane zirconium dichloride, (cyclopentadienyl)(indenyl) (methyl) (phenylethynyl)silane zirconium dichloride, (cyclopentadienyl)(9-fluorenyl) (methyl)(methylethynyl) silane zirconium dichloride, and the like.

Examples of bridged bis-indenyl metallocenes having alkynyl groups are also suggested in U.S. Pat. No. 5,391,790. Such metallocenes are within the scope required by the present invention when the alkynyl groups are internal alkynyl.

The term fluorenyl as used herein refers to 9-fluorenyl unless specifically indicated as otherwise. Accordingly, the term fluorenyl and 9-fluorenyl should be viewed as equivalent unless something indicates otherwise.

The organo aluminoxane component used in preparing the inventive solid catalyst system is an oligomeric aluminum compound having repeating units of the formula

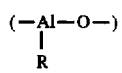

Some examples are often represented by the general formula (R—Al—O)$_n$ or R(R—Al—O—)$_n$AlR$^2$. In the general aluminoxane formula R is a C$_1$-C$_5$ alkyl radical, for example, methyl, ethyl, propyl, butyl or pentyl and "n" is an integer from 1 to about 50. Most preferably, R is methyl and "n" is at least 4. Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally the reaction of an aluminum alkyl with a limited amount of water is postulated to yield a mixture of the linear and cyclic species of the aluminoxane.

In the first step of the present invention, the metallocene and aluminoxane are combined in the presence of a suitable liquid to form a liquid catalyst system. It is preferred that the liquid catalyst system be prepared using an organic liquid in which the aluminoxane is at least partially soluble. The currently preferred liquids are hydrocarbons such as hexane or toluene. Typically an aromatic liquid solvent is employed. Examples include benzene, toluene, ethylbenzene, diethylbenzene, and the like. The amount of liquid to be employed is not particularly critical. Nevertheless, the amount should preferably be such as to dissolve the product of the reaction between the metallocene and the aluminoxane, provide desirable polymerization viscosity for the prepolymerization, and to permit good mixing. The temperature is preferably kept below that which would cause the metallocene to decompose. Typically the temperature would be in the range of −50° C. to 100° C. Preferably, the metallocene, the aluminoxane, and the liquid diluent are combined at room temperature, i.e. around 10° to 30° C. The reaction between the aluminoxane and the metallocene is relatively rapid. The reaction rate can vary depending upon the ligands of the metallocene. It is generally desired that they be contacted for at least about a minute to about 1 hour.

It is within the scope of the invention to form the liquid catalyst system in the presence of a particulate solid. Any number of particulate solids can be employed as the particulate solid. Typically the support can be any organic or inorganic solid that does not interfere with the desired end result. Examples include porous supports such as talc, inorganic oxides, and resinous support materials such as particulate polyolefins. Examples of inorganic oxide materials include Groups II, III, IV or V metal oxides such as silica, alumina, silica-alumina, and mixtures thereof. Other examples of inorganic oxides are magnesia, titania, zirconia, and the like. Other suitable support materials which can be employed include materials such as, magnesium dichloride, and freely divided polyolefins, such as polyethylene. It is within the scope of the present invention to use a mixture of one or more of the particulate solids.

It is generally desirable for the solid to be thoroughly dehydrated prior to use, preferably it is dehydrated so as to contain less than 1% loss on ignition. Thermal dehydration treatment may be carded out in vacuum or while purging with a dry inert gas such as nitrogen at a temperature of about 20° C. to about 1000° C., and preferably, from about 300° C. to about 800° C. Pressure considerations are not critical. The duration of thermal treatment can be from about 1 to about 24 hours. However, shorter or longer times can be employed provided equilibrium is established with the surface hydroxyl groups.

Dehydration can also be accomplished by subjecting the solid to a chemical treatment in order to remove water and reduce the concentration of surface hydroxyl groups. Chemical treatment is generally capable of converting all water and hydroxyl groups in the oxide surface to relatively inert species. Useful chemical agents are for example, trimethylaluminum, ethyl magnesium chloride, chlorosilanes such as $SiCl_4$, disilazane, trimethylchlorosilane, dimethylaminotdmethylsilane and the like.

The chemical dehydration can be accomplished by slurrying the inorganic particulate material such as, for example silica, in an inert low boiling hydrocarbon, such as for example, hexane. During the chemical dehydration treatment, the silica should be maintained in a moisture and oxygen free atmosphere. To the silica slurry is then added a low boiling inert hydrocarbon solution of the chemical dehydrating agent, such as, for example dichloroldimethylsilane. The solution is added slowly to the slurry. The temperature ranges during chemical dehydration reaction can be from about 20° C. to about 120° C., however, higher and lower temperatures can be employed. Preferably, the temperature will be about 50° C. to about 100° C. The chemical dehydration procedure should be allowed to proceed until all the substantially reactive groups are removed from the particulate support material as indicated by cessation of gas evolution. Normally, the chemical dehydration reaction will be allowed to proceed from about 30 minutes to about 16 hours, preferably, 1 to 5 hours. Upon completion of the chemical dehydration, the solid particulate material may be filtered under a nitrogen atmosphere and washed one or more times with a dry, oxygen free inert solvent. The wash solvents as well as the diluents employed to form the slurry and the solution of chemical dehydrating agent, can be any suitable inert hydrocarbon. Illustrative of such hydrocarbons are pentane, heptane, hexane, toluene, isopentane and the like.

Another chemical treatment that can be used on solid inorganic oxides such as silica involves reduction by contacting the solid with carbon monoxide at an elevated temperature sufficient to convert substantially all the water and hydroxyl groups to relatively inactive species.

The specific particle size of the support or inorganic oxide, surface area, pore volume, and number of hydroxyl groups is not considered critical to its utility in the practice of this invention. However, such characteristics often determine the mount of support to be employed in preparing the catalyst compositions, as well as affecting the particle morphology of polymers formed. The characteristics of the carrier or support must therefore be taken into consideration in choosing the same for use in the particular invention.

It is also within the scope of the present invention to add such a particulate solid to the liquid catalyst system after it has been formed and to carry out the prepolymerization in the presence of that solid.

The mount of aluminoxane and metallocene used in forming the liquid catalyst system for the prepolymerization can vary over a wide range. Typically, however, the molar ratio of aluminum in the aluminoxane to transition metal of the metallocene is in the range of about 1:1 to about 20,000:1, more preferably, a molar ratio of about 50:1 to about 2000:1 is used. If a particulate solid, i.e. silica, is used generally it is used in an amount such that the weight ratio of the metallocene to the particulate solid is in the range of about 0.00001/1 to 1/1, more preferably 0.0005/1 to 0.2/1.

The prepolymerization is conducted in the liquid catalyst system, which can be a solution, a slurry, or a gel in a liquid. A wide range of olefins can be used for the prepolymerization. Typically, the prepolymerization will be conducted using an olefin, preferably selected from ethylene and non-aromatic alpha-olefins, and as propylene. It is within the scope of the invention to use a mixture of olefins, for example, ethylene and a higher alpha olefin can be used for the prepolymerization. The use of, a higher alpha olefin, such as 1-butene, with ethylene is believed to increase the amount of copolymerization occurring between the olefin monomer and the olefinically unsaturated portion of the metallocene.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about −30° C. to about +110° C., more preferably in the range of about +10 to about +30° C. The amount of prepolymer can be varied but typically would be in the range of from about 1 to about 95 wt % of the resulting prepolymerized solid catalyst system, more preferably about 5 to 80 wt %. It is generally desirable to carry out the prepolymerization to at least a point where substantially all of the metallocene is in the solid rather than in the liquid since that maximizes the use of the metallocene.

After the prepolymerization, the resulting solid prepolymerized catalyst is separated from the liquid of the reaction mixture. Various techniques known in the art can be used for carrying out this step. For example, the material could be separated by filtration, decantation, or by vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from the liquid, the resulting solid is preferably washed with a hydrocarbon and then dried using high vacuum to remove substantially all the liquids and other volatile components that might still be associated with the solid. The vacuum drying is preferably carried out under relatively mild conditions, i.e. temperatures below 100° C. More typically the prepolymerized solid is dried by subjection to a high vacuum at a temperature of about 30° C. until a substantially constant weight is achieved. A preferred technique employs at least one initial wash with an aromatic hydrocarbon, such as toluene, followed by a wash with a paraffinic hydrocarbon, such as hexane, and then vacuum drying.

It is within the scope of the present invention to contact the prepolymerization reaction mixture product with a liquid in which the prepolymer is sparingly soluble, i.e. a counter solvent for the prepolymer, to help cause soluble prepolymer to precipitate from the solution. Such a liquid is also useful for the subsequent washing of the prepolymerized solid.

It is also within the scope of the present invention to add a particulate solid of the type aforementioned after the prepolymerization. Thus one can add the solid to the liquid prepolymerization product before the counter solvent is added. In this manner soluble prepolymer tends to precipitate onto the surface of the solid to aid in the recovery of the filtrate in a particulate form and to prevent agglomeration during drying. The liquid mixture resulting from the prepolymerization or the inventive solid prepolymerized catalyst can be subjected to sonification to help break up particles if desired.

Further, if desired the recovered solid prepolymerized catalyst system can be screened to give particles having sizes that meet the particular needs for a particular type of polymerization.

Another option is to combine the recovered inventive solid prepolymerized catalyst system with an inert hydrocarbon, such as one of the type used as a wash liquid, and then to remove that liquid using a vacuum. In such a process it is sometimes desirable to subject the resulting mixture to sonification before stripping off the liquid.

The resulting solid prepolymerized metallocene-containing catalyst system is useful for the polymerization of olefins. Generally, it is not necessary to add any additional aluminoxane to this catalyst system. In some cases it may be found desirable to employ small amounts of an organoaluminum compound as a scavenger for poisons. The term organoaluminum compounds include compounds such as triethylaluminum, trimethylaluminum, diethylaluminium chloride, ethylaluminum dichloride, ethylaluminum sesquichloride, and the like. Trialkyl aluminum compounds are currently preferred. Also in some applications it may be desirable to employ small amounts of antistatic agents which assist in preventing the agglomeration of polymer particles during polymerization. Still further, when the inventive catalyst system is added to a reactor as a slurry in a liquid, it is sometimes desirable to add a particulate dried solid as a flow aid for the slurry. Preferably the solid has been dried using one of the methods described earlier. Inorganic oxides such as silica are particularly preferred. Currently, it is preferred to use a fumed silica such as that sold under the trade name Cab-o-sil. Generally the fumed silica is dried using heat and trimethylaluminum.

The solid catalyst system is particularly useful for the polymerization of alpha-olefins having 2 to 10 carbon atoms. Examples of such olefins include ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene, and the like and mixtures thereof. The catalysts are also useful for preparing copolymers of ethylene and propylene and copolymers of ethylene or propylene and a higher molecular weight olefin.

The polymerizations can be carded out under a wide range of conditions depending upon the particular metallocene employed and the particular results desired. Although the inventive catalyst system is a solid, it is considered that it is useful for polymerization conducted under solution, slurry, or gas phase reaction conditions.

When the polymerizations are carried out in the presence of liquid diluents obviously it is important to use diluents which do not have an adverse effect upon the catalyst system. Typical liquid diluents include propane, butane, isobutane, pentane, hexane, heptane, octane, cyclohexane, methylcyclohexane, toluene, xylene, and the like. Typically the polymerization temperature can vary over a wide range, temperatures typically would be in a range of about −60° C. to about 300° C., more preferably in the range of about 20° C. to about 160° C. Typically the pressure of the polymerization would be in the range of from about 1 to about 500 atmospheres or even greater. The inventive catalyst system is particularly useful for polymerizations carded out under particle form, i.e., slurry-type polymerization conditions.

The polymers produced with this invention have a wide range of uses that will be apparent to those skilled in the art from the physical properties of the respective polymers. Applications such as molding, films, adhesives, and the like are indicated.

A further understanding of the present invention, its various aspects, objects and advantages will be provided by the following examples.

EXAMPLE I

Polymerization with $(Cp)(2,7-(PhC{\equiv}C{-})_2Fl)ZrCl_2$

This run was carded out to determine the effectiveness of the metallocene (2,7-di(phenyl ethynyl)fluorenyl)(cyclopentadienyl) zirconium dichloride. The polymerization technique involved forming a catalyst slurry by combining 0.142 g of the metallocene with 10 mL of a 1.1 molar toluene solution of methylaluminoxane obtained from Schering. One mL of the resulting catalyst slurry was injected into an autoclave. The autoclave was fried with 2 liters of isobutane and the temperature raised to about 90° C. Then hydrogen was added from a 300 cc vessel in an amount equal to a 10 psi pressure drop in the vessel and then the reactor was pressurized to 450 psig with ethylene. The polymerization was continued for 1 hour after reaching 90° C. Then the reactor was cooled and vented and the solid polymer was recovered. It was observed that the reactor vessel had a polymer adhering to the internal surfaces. The polymer fouling was in the range of 3/16" to ½" thick.

EXAMPLE II

Solid Prepolymerized Catalyst System

A catalyst was prepared using the remaining amount of a catalyst slurry of Example I. In a dry box, 1 g of 948 Davidson silica, which had been dried with trimethylaluminum, was added along with 10 mL of additional toluene. The mixture was then moved to a hood and contacted with 5 psig ethylene for 2 hours. The resulting solid was washed two times with 25 mL of toluene and two times with 25 mL of hexane. The resulting yellow solid was then placed under a high vacuum for 3 hours. Approximately 2.18 g of a light yellow solid catalyst system was recovered. This will be referred to as Inventive Catalyst System A.

The solid Inventive Catalyst System A was added to an auto clave containing 2 liter of isobutane. The temperature was raised to about 90° C. Then nitrogen was added from a 300 cc vessel in an amount equal to a 10 psi pressure drop in the vessel and then the reactor was pressurized with 450 psig ethylene. The polymerization was continued for 1 hour and the reactor was cooled and vented, and the solid polymer was recovered. It was observed that there was only a light fouling on the bottom of the reactor. The amount of fouling was thus significantly less than that observed in the polymerization of Example I.

A repeat polymerization was carried out in the same manner using slightly more of the solid catalyst system, i.e. 0.1232 g rather than 0.0833 g.

In this case, there was even less fouling than in the previous run. The polymers from these two runs were mixed together and evaluated for properties. The polymer had a melt index of 10,000 dg/min. The weight average molecular weight was 8,260 and the number average molecular weight was 2,340.

EXAMPLE III

Polymerization with $(Cp)(2,7-(t-BuC\equiv C)_2(Fl)ZrCl_2$

In this run, the utility of the metallocene (cyclopentadienyl)(2,7-di (t-butyl ethynyl) fluorenyl) zirconium dichloride was evaluated. This metallocene could also be named (cyclopentadienyl) (2,7 di-(3,3-dimethyl but-1-ynyl) fluorenyl) zirconium dichloride. A catalyst slurry was prepared by combining 0.25 g of this metallocene with 10 mL of a 1.1 molar metal aluminoxane toluene solution obtained from Shering. Using about 0.5 mL of this catalyst slurry ethylene was polymerized using the same procedure as used in Example I. After the one hour polymerization, it was noted that there was significant polymer buildup all over the reactor approximately ⅛" thick. Another run was carried out using 0.7 mL of the catalyst slurry for copolymerization of ethylene with hexene-1. The same result was noted, namely that there was a significant amount of fouling.

EXAMPLE IV

The remaining catalyst slurry from Example III was combined with 10 mL of toluene and 1 g of 148 Davison silica which had been dried with trimethylaluminum. The resulting slurry was moved to a hood and ethylene was charged at 5 psig for 2 hours. The resulting solid was washed twice with 25 mL of toluene and twice with 25 mL of hexane. The resulting solid was light yellow. The solid was then placed under a high vacuum for 3 hours. A light yellow solid catalyst system was recovered. The solid catalyst system was then employed in an amount of 0.873 g using polymerization conditions like those used in Example 11. After the polymerization was terminated, it was noted that there was only a light fouling in the bottom of the reactor.

That which is claimed is:

1. A process for polymerizing ethylene comprising preparing a solid metallocene-containing catalyst system by
    (a) combining an organoaluminoxane and at least one metallocene having a ligand having at least one substituent with an internal alkyne functionality in a liquid to form a liquid catalyst system,
    (b) conducting prepolymerization of ethylene in the presence of said liquid catalyst system to produce a prepolymerized solid catalyst, and
    (c) separating the resulting solid from the liquid and the components dissolved in the liquid to yield said solid metallocene-containing catalyst system, and
    contacting ethylene under slurry polymerization conditions in the presence of an alkane liquid diluent and said solid metallocene-containing catalyst system.

2. A process according to claim 1 wherein after the solid is separated from the liquid in step (c) the solid is subjected to drying to remove substantially all the liquid.

3. A method according to claim 2 wherein an aromatic solvent is used for forming the liquid catalyst system.

4. A method according to claim 3, wherein the solvent that is used for forming the liquid catalyst system is toluene.

5. A method according to claim 4, wherein a solid particulate support is added to the reaction product of step (b), then a liquid in which the prepolymer is sparingly soluble is added, and the resulting solids are recovered by filtering, washing, and drying.

6. A method according to claim 5, wherein said particulate support is silica.

7. A method according to claim 4, wherein the solid is separated from the liquid in step (c) by filtering, then washing the recovered solid with a hydrocarbon, and then drying the washed solid.

8. A method according to claim 7, wherein an alkane is used in the washing.

9. A process according to claim 4, wherein the prepolymerization involves the prepolymerization of ethylene.

10. A process according to claim 9, wherein the prepolymerization involves the prepolymerization of a mixture of ethylene and 1-butene.

11. A method according to claim 1, wherein step (a) is conducted in the presence of a particulate support that is insoluble in the liquid being employed in step (a).

12. A method according to claim 11, wherein said particulate support is an inorganic oxide.

13. A process according to claim 1, wherein step (a) is conducted in the presence of a metallocene selected from the group consisting of bridged metallocenes represented by the formula $R(Z)(Z)MeQ_k$ and unbridged metallocenes of the formula $(Z)(Z)MeQ_k$ wherein each Z is bound to Me and is the same or different and is a ligand selected from substituted or unsubstituted cyclopentadienyl, indenyl, tetrahydroindenyl, octahydrofluorenyl, benzofluorenyl, and fluorenyl ligands; R is a structural bridge linking the Z's and Me is a metal selected from the group consisting of IVB, VB, and VIB metals of the Periodic Table, each Q is the same or different and is selected from the group consisting of hydrogen, halogens, and organoradicals; k is a number sufficient to fill out the remaining valances of Me; with the further proviso at least one of said Z's or R has at least one internal alkynyl substituent attached to it.

14. A method according to claim 13, wherein said internal alkynyl substituent is selected from phenylethynyl, n-butylethynyl, t-butylethynyl, and methylethynyl.

15. A process according to claim 1, wherein the metallocene is selected from the group consisting of (2,7-di(phenylethynyl)fluorenyl) (cyclopentadienyl) zirconium dichloride, (2,7-di(phenylethynyl)fluorenyl) (cyclopentadienyl) hafnium dichloride, (2,7-di(t-butylethynyl)fluorenyl) (cyclopentadienyl) zirconium dichloride, (2,7-di(t-butylethynyl)fluorenyl) (cyclopentadienyl) hafnium dichloride, (2,7-di(n-butylethynyl)fluorenyl) (cyclopentadienyl) zirconium dichloride, (2,7-di(n-butylethynyl)fluorenyl) (cyclopentadienyl) hafnium dichloride, (2,7-di(methylethynyl)fluorenyl) (cyclopentadienyl) zirconium dichloride, (2,7-di(methylethynyl)fluorenyl) (cyclopentadienyl) hafnium dichloride, 1,2-bis-(2,7-di(n-butylethynyl)fluorenyl) ethane zirconium dichloride, and 1,2-bis-(2,7-di(n-butylethynyl)fluorenyl)ethane hafnium dichloride.

16. A method according to claim 1, wherein at least two different metallocenes are present during the prepolymerization.

17. A method according to claim 16, wherein at least two different metallocenes each having at least one internal alkynyl substituent are employed during the prepolymerization.

18. A process according to claim 16, wherein at least one of the metallocene contains a substituted or unsubstituted fluorenyl group.

19. A method according to claim 18, wherein at least two different bridged metallocenes are employed each having at least one internal alkynyl substituent.

20. A process according to claim 1 wherein said solid metallocene-containing catalyst system is prepared using a metallocene containing at least one fluorenyl group.

21. A process according to claim 20 wherein the polymerization is conducted in a continuous loop reactor and isobutane is used as a liquid diluent for the polymerization.

22. A process according to claim 21 wherein the solid metallocene-containing catalyst system used in the polymerization is prepared by (a) combining in a liquid an alkylaluminoxane and at least one metallocene selected from the group consisting of bridged metallocenes represented by the formula R(Z)(Z)MeQ$_k$ and unbridged metallocenes of the formula (Z)(Z) MeQ$_k$ wherein each Z is bound to Me and is the same or different and is a ligand selected from substituted or unsubstituted cyclopentadienyl, indenyl, tetrahydroindenyl, octahydrofluorenyl, benzofluorenyl, and fluorenyl ligands; R is a structural bridge linking the Z's and Me is a metal selected from the group consisting of IVB, VB, and VIB metals of the Periodic Table, each Q is the same or different and is selected from the group consisting of hydrogen, halogens, and organoradicals; k is a number sufficient to fill out the remaining valances of Me; with the further proviso that at least one of said Z's or R has at least one internal alkynyl substituent, (b) prepolymerizing ethylene in the resulting liquid, in the presence of silica, and (c) separating the resulting solid from the liquid.

23. A process according to claim 22 wherein the liquid used in step (a) consists essentially of an aromatic liquid.

24. A process according to claim 22 wherein said solid metallocene-containing catalyst system is prepared using a metallocene selected from the group consisting of (2,7-di(phenylethynyl)fluorenyl) (cyclopentadienyl) zirconium dichloride, (2,7-di(phenylethynyl)fluorenyl) (cyclopentadienyl) hafnium dichloride, (2,7-di(t-butylethynyl)fluorenyl) (cyclopentadienyl) zirconium dichloride, (2,7-di(t-butylethynyl)fluorenyl) (cyclopentadienyl) hafnium dichloride, (2,7-di(n-butylethynyl)fluorenyl) (cyclopentadienyl) zirconium dichloride, (2,7-di(n-butylethynyl)fluorenyl) (cyclopentadienyl) hafnium dichloride, (2,7-di(methylethynyl)fluorenyl) (cyclopentadienyl) zirconium dichloride, (2,7-di(methylethynyl)fluorenyl) (cyclopentadienyl) hafnium dichloride, 1,2-bis-(2,7-di(n-butylethynyl)fluorenyl) ethane zirconium dichloride, and 1,2-bis-(2,7-di(n-butylethynyl)fluorenyl) ethane hafnium dichloride.

25. A process according to claim 22 wherein R is a saturated alkylene diradical having 1 to 4 carbon atoms in its main chain.

26. A process according to claim 25 wherein R is —CH$_2$—.

27. A process according to claim 25 wherein R is selected from divalent dihydrocarbyl silanes.

28. A process according to claim 22 wherein said solid metallocene-containing catalyst system is prepared using (2,7-di(phenyl ethynyl) fluorenyl) (cyclopentadienyl) zirconium dichloride.

29. A process according to claim 22 wherein said solid metallocene-containing catalyst system is prepared using the metallocene (cyclopentadienyl) (2,7-di(t-butyl ethynyl) fluorenyl) zirconium dichloride.

30. A process for polymerizing ethylene under slurry polymerization conditions in the presence of an alkane liquid diluent comprising contacting ethylene with a solid metallocene-containing catalyst system produced by the steps comprising:

(a) combining an organoaluminoxane and at least one metallocene having a ligand having at least one substituent with an internal alkyne functionality in a liquid to form a liquid catalyst system, (b) conducting prepolymerization of ethylene in the presence of said liquid catalyst system to produce a prepolymerized solid catalyst, and (c) separating the resulting solid from the liquid and the components dissolved in the liquid to yield said solid metallocene-containing catalyst system.

* * * * *